US008771514B2

(12) United States Patent
Cobos De La Fuente

(10) Patent No.: US 8,771,514 B2
(45) Date of Patent: Jul. 8, 2014

(54) SEQUENTIAL FILTER PACK FOR FLUIDS

(75) Inventor: Alfonso Cobos De La Fuente, Madrid (ES)

(73) Assignee: Universidad Politecnica de Madrid, Madrid (ES)

( * ) Notice: Subject to any disclaimer, the term of this patent is extended or adjusted under 35 U.S.C. 154(b) by 209 days.

(21) Appl. No.: 13/379,434

(22) PCT Filed: Jun. 21, 2010

(86) PCT No.: PCT/ES2010/000273
§ 371 (c)(1),
(2), (4) Date: Dec. 20, 2011

(87) PCT Pub. No.: WO2010/149804
PCT Pub. Date: Dec. 29, 2010

(65) Prior Publication Data
US 2012/0097598 A1    Apr. 26, 2012

(30) Foreign Application Priority Data
Jun. 26, 2009 (ES) .................... 200901498

(51) Int. Cl.
*B01D 25/00* (2006.01)
*B01D 29/46* (2006.01)
*B01D 35/22* (2006.01)

(52) U.S. Cl.
CPC ............... *B01D 29/46* (2013.01); *B01D 25/16* (2013.01); *B01D 25/18* (2013.01)
USPC ........ 210/345; 210/323.1; 210/346; 210/486; 210/488; 210/498; 210/333.01; 210/411

(58) Field of Classification Search
CPC ..................................................... B01D 29/46
See application file for complete search history.

(56) References Cited

U.S. PATENT DOCUMENTS

| 4,292,178 A * | 9/1981 | Mori et al. ............... 210/352 |
| 4,683,060 A | 7/1987 | Drori |
| 4,744,901 A | 5/1988 | Drori |
| 5,176,829 A * | 1/1993 | Drori ........................ 210/346 |

FOREIGN PATENT DOCUMENTS

GB                300600         11/1928

* cited by examiner

*Primary Examiner* — Benjamin Kurtz
(74) *Attorney, Agent, or Firm* — Tristan A. Fuierer; Moore & Van Allen, PLLC

(57) ABSTRACT

The present invention relates to a filter pack formed by stacking rings, being used as a final element in multistage or single-stage filters. The filtration process is performed by consecutively separating the particles in suspension according to the thickness thereof in different areas.

5 Claims, 3 Drawing Sheets

SEQUENTIAL FILTER PACK FOR FLUIDS

CROSS-REFERENCE TO RELATED APPLICATIONS

This application is filed under the provisions of 35 U.S.C. §371 and claims the priority of International Patent Application No. PCT/ES2010/000273 filed on 21 Jun. 2010 entitled "Sequential Filter Pack for Fluids" in the name of Alfonso COBOS DE LA FUENTE, which claims priority of Spanish Patent Application No. P200901498 filed on 26 Jun. 2009, both of which are hereby incorporated by reference herein in their entirety.

FIELD OF THE INVENTION

The present patent relates to a filter pack of those used in filters which remove solid particles dispersed in fluids and which is formed by stacking a series of disks or rings around a shaft. This filter pack sequentially separates dirt by diameters in different areas which are then washed together.

The use of filters of this type is widespread in agriculture for filtration equipment filtering the water used in localized irrigation. Similarly, environmental demands recommend the use of filters for dumping industrial and urban water into public river beds. They are very useful in water desalination plants and can also be used in air and other fluids.

BACKGROUND OF THE INVENTION

Filters with different filter elements are used for cleaning water with solid particles in suspension, the packs being formed with superimposed rings or disks which produce the best results, above all for removing very fine particles.

Many patents using cartridge filters with differently grooved annulus-shaped rings are known. The Spanish Utility model ES1040967U thus mentions rings with uniformly laid out grooves inclined on one of their faces. The Spanish Utility models ES1050263U and ES1055543U describe a ring grooved on both faces. Patent GB 2147516A presents a pack of rings formed by means of a helical strip. EP 1308195A1 describes a perforated-disk based filter system. U.S. Pat. No. 4,740,302(A) relates to a filter with a filter pack formed by extruded U-shaped rings and passage through microchannels. The Spanish Patent ES2277792 divides the dirt by diameters in different places according to the different filtration phases, which represents a significant advantage which delays clogging time. The last phase of the filter indicated in this patent comprises a pack of rings, but the configuration thereof is not shown.

The problems of these systems having a single filtration phase increases when the water is very dirty since the rapid clogging of the filter pack in its filtration area means that there is no practical filtering time and all the flow is used for the necessary consecutive washings. This reduces the performance of the filter, greatly increasing the water drained in the washing. This problem is dealt with by the present invention which separates dirt by diameters in different areas of the filter pack, the time between washes and the filtration performance being increased, in addition to other improvements, as will be indicated throughout the following description.

DESCRIPTION OF THE INVENTION

The present invention describes a filter pack formed by a set of disk-shaped rings with an annulus geometry which are stacked around a central outlet collector.

The front of each ring has different projections distributed according to equal circular sectors until circumferentially covering the front of the ring. These projections comprise: connecting arched ribs connected to one another covering the entire perimeter of the ring; final arched ribs placed after the first arched ribs; channels of decreasing section towards the center of the ring and channels of increasing section towards the center of the ring, both types of channels being alternately located on the entire surface of the ring and separated from one another by partitions.

The back of the ring is flat and has a series of shallow grooves with a small section which can be triangular, square, rectangular or curved suitable for the degree of filtration required, which grooves are laid out circumferentially with the center of the disk and extended matching up with the part corresponding to the front area provided with the aforementioned partitions.

Each of the connecting arched ribs forms a barrier of uniform height and when several sets of arched ribs are consecutively arranged, the arched ribs of each set are of uniform height with respect to one another and the arched ribs of consecutive sets are of increasing height, increasing as they advance towards the center of the ring. The free space between each set of arched ribs and the next ring placed on top will determine the maximum thickness of the solid particles that can pass through, and therefore the filtration is carried out by consecutively separating the solid particles by diameters in different areas.

At the inlet of the filter pack, the diameter of the retained particles is determined according to the height of the separating partitions; in each set of arched ribs the diameter of the retained particles is determined according to the gap left by the height itself of the arched ribs; and in the channels of decreasing section, the diameter of the retained particles is determined according to the dimensions of the small grooves located on the back of the ring.

Thus, the first filtration area is arranged on the outer surface of the pack of rings and only particles with a diameter less than the space between edges of consecutive rings will be able to penetrate the cartridge filter, the rest remaining on the surface of the pack until being removed by any of the cleaning methods. The flow then passes through two or more barriers formed by the sets of arched ribs having progressively increasing height to retain solid particles with an increasingly smaller diameter. Between two consecutive sets of arched ribs there is defined a free flow circulation area ensuring the passage of fluid even when the passages defined by the previous projections are blocked. The set of final arched ribs that is arranged has the greatest height among all the arched ribs and is located at the inlet of the channels of decreasing section. The position of each rib is matched up with the inlet of a new area demarcated by the partitions which are directed towards the center, the height of which is constant and maximum with respect to the height of the remaining projections on the front. These channels occupy a relatively broad area which decreases in width upon approaching the center of the ring and serves as a pool so that the finest particles are deposited in it. Each of these channels of decreasing section is alternated with another channel of increasing section, said channels of decreasing section being closed at their beginning and advancing towards the center of the ring with a progressive increase in their section.

When the filter pack is formed, a small passage for water through the small circumferential grooves remains free upon matching up the grooved back with the partitions on the front. The flow goes from both sides of the channels of decreasing section to the channels of increasing section conducting the flow of clean water to the central outlet collector of the filter. This is where the final filtering takes place, the dimensions of the small grooves of the back of the rings being responsible for the definitive degree of filtration as they do not allow the passage of solid particles greater than that determined by their small dimensions. However, a sequential separation of dirt by diameters, which will determine less clogging of the filter pack and high performance of the filter, which translates into a greater time dedicated to filtration and less water consumption for washing, has been occurring in different places throughout the entire passage of the fluid through the series of barriers arranged.

The pack of rings can be used in any of the existing filters and can be washed manually in small installations containing only one or a few filters, or mechanically in multiple filter equipment by the reverse flow process using the water filtered by the other elements. In order to facilitate mechanical washing, the rings allow the following adaptations:

a) The inner edge of the rings is arranged at an angle to facilitate the separation thereof when the jets strike them in the reverse backwash process.

b) The sharp edges that so require it will be rounded to facilitate entrainment of the solid particles in the backwash, i.e., for a direction of the flow from the center outwards.

c) Compressed air can be injected into the backwashing circuit, mixed with the reverse flow of this process, to save water and due to the instability it produces, which facilitates the entrainment of the retained particles.

DESCRIPTION OF A PREFERRED EMBODIMENT OF THE INVENTION

Figure 1:
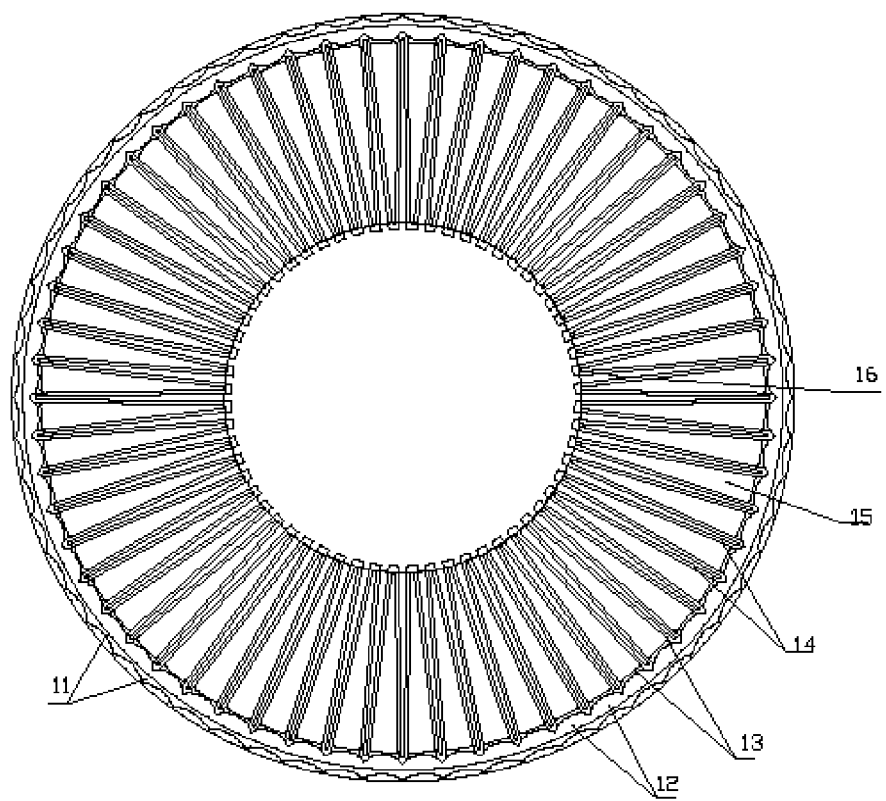
FIG. 1 comprises a view of the front of the rings, the different ribbed barriers (11) and (13) as well as an intermediate interconnecting circumferential channel (12) for interconnecting flow being shown, the dividing partitions (14) for the channels of decreasing section (15) and increasing section (16) for filtered liquid are also shown.
Figure 2:
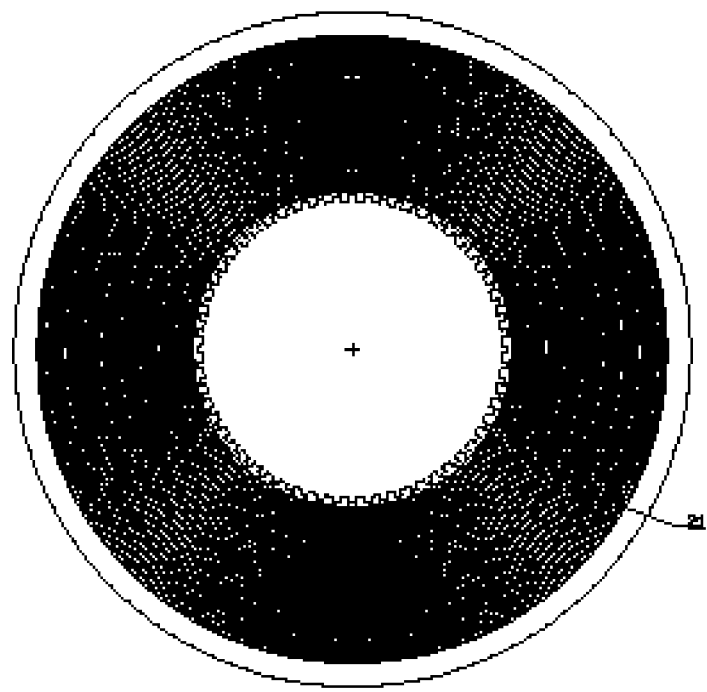
FIG. 2 shows the back of the rings with the small grooves (21) responsible for the definitive degree of filtration.

A complete description of a preferred embodiment of the mentioned device is made below by way of example, having a non-limiting character and being susceptible to all those detail modifications which do not fundamentally alter its essential features.

The filter ring device is placed around a central outlet collector of the filter, forming a pack by stacking consecutive annulus-shaped disks. Each of these rings has a front and a back, being placed to form a pack by matching up the front of a ring with the back of the next ring.

Connecting arched ribs (11) connected to one another, final arched ribs (13), channels of decreasing section (15) and channels of increasing section (16) are arranged on the front of each ring. The partitions (14) separating some channels from others have a uniform height which is the maximum height with respect to the height of the remaining projections, said height determining the space which remains free on the surface of the pack between rings when they are superimposed. The particles with dimensions greater than this free space will not be able to penetrate inside the pack, remaining on its surface until the washing process. However, the finest particles will pass through to a set of circumferentially connected arched ribs (11) of uniform height. There can be different sets of arched ribs the height of which will increase, but in this case only two are provided. These arched ribs act as barriers and will retain increasingly smaller particles. An intermediate interconnecting circumferential channel (12) facilitating the passage of fluid between each longitudinal set of arched ribs so that all of them are active even when the previous arched ribs are blocked by impurities, will be arranged between the set of arched ribs (11) and of final arched ribs (13).

The last consecutive set of arched ribs (13) allows passage to areas limited by the partitions (14) advancing towards the center with a decreasing width, defining channels of decreasing section (15). Other areas advancing towards the center defining channels of increasing section (16) for conducting the clean flow alternating with said areas. The fine partitions (14) demarcating these areas have their upper part ending in a flat surface, all of them having the same height, which cannot large since it serves to establish the free area between rings of the first filtration phase located at the edge of the pack. The reason for the variation of the sections in the channels of increasing section (16) and decreasing section (15) compared with other systems of constant or U-shaped sections is the hydraulic design since once the sections are correctly defined, the pressure drops will be reduced and the efficiency of the rings will be increased as a greater number of said channels is allowed until circumferentially filling the annular surface of the front.

Figure 3:
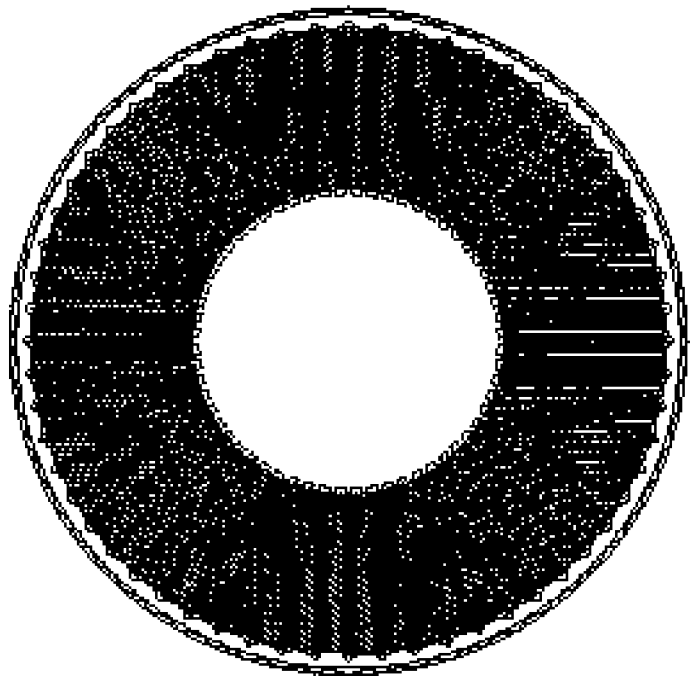
FIG. 3 indicates in dots position of the small grooves on the front of the rings when they superimposed.

The back of the rings is flat with very shallow circumferential grooves (21) having a rectangular section distributed in an area corresponding with the aforementioned partitions as shown in FIG. 3. The grooved area matches up with the upper surfaces of the partitions upon stacking the rings to form the filter pack, leaving the small sections of the grooves free for the passage of water.

Thus, after the flow has passed through, being consecutively cleaned by the arched ribs, said flow goes from the area corresponding to the channels of decreasing section (15) to the channels of increasing section (16), the smallest particles remaining in the channel of decreasing section because they cannot go through the small grooves (21) of the back of the rings, while the clean water flows through the channels of increasing section (16) to the outlet collector tube.

Figure 4:
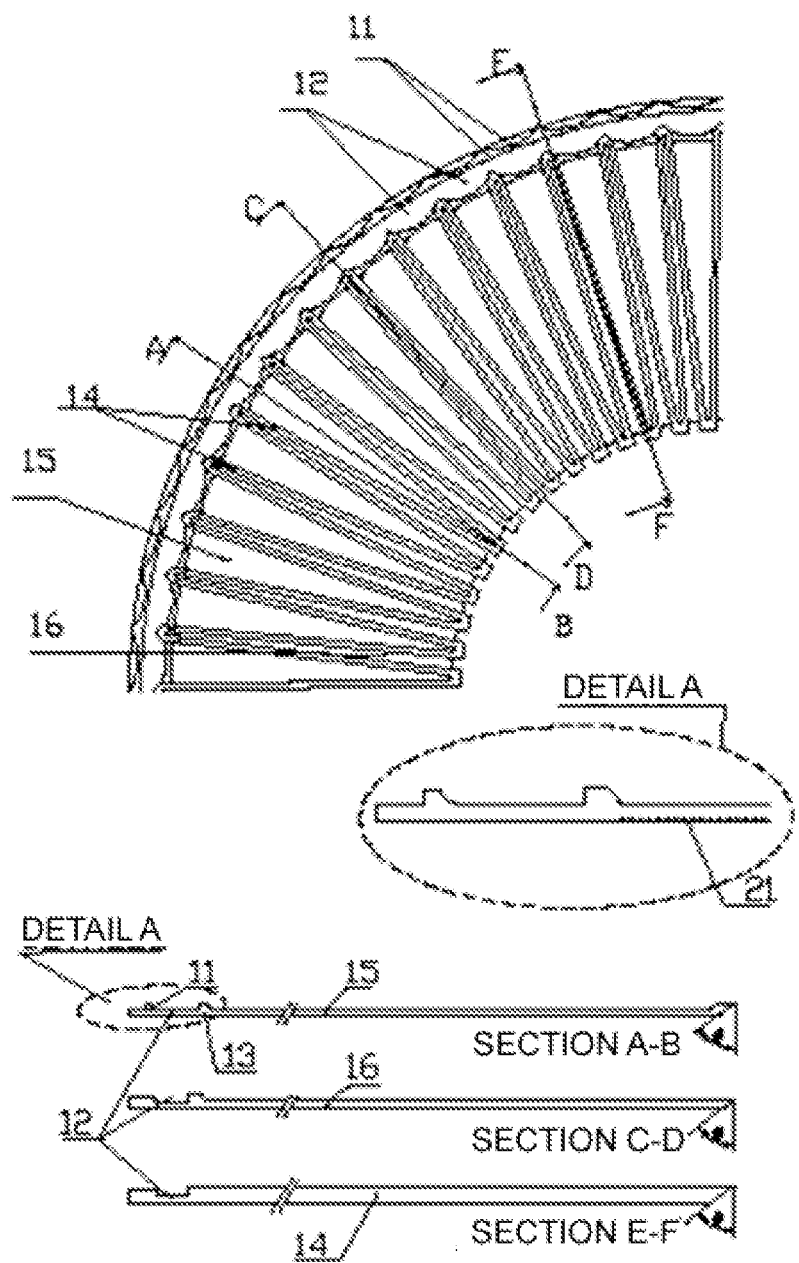
FIG. 4 depicts an enlarged part of the ring with different enlarged cross-sections made in a channel of decreasing section A-B, in another one of increasing section C-D or on a partition E-F, in which the angle θ of the bevel of the inner edge can be observed and in detail A, the outer edge is also enlarged to show the arched ribs and the grooves (21).

The inner edge of the rings is beveled to facilitate the separation thereof by the action of backwashing jets (FIG. 4, θ). The sharp edges which are able to retain particles are rounded, making the entrainment of such particles in the backwash difficult (detail A in FIG. 4). Compressed air will be injected into the counter-current flow to favor the cleaning and to save washing water.

The dimensions must be assessed by a good designed who, depending on the proportion between the sizes of the particles to be separated, will determine the sequence of heights in the consecutive barriers arranged to obtain the most suitable filter pack according to this invention.

The invention claimed is:

1. A sequential filter pack for fluids comprising a set of superimposed disk-shaped rings with an annulus geometry, each of which has a plurality of circumferentially distributed grooves on its back and a plurality of projections on its front according to equal circular sectors until circumferentially covering the front of the ring; between these projections, each ring comprises radially arranged projections defining partitions (14) such that they give rise to alternating channels of increasing section (16) and channels of decreasing section (15), wherein each ring additionally comprises two (11, 13) sets of projections each of them formed by connecting arched ribs (11) forming a barrier of uniform height wherein the height of the set of arched ribs (13) closer to the center is greater than that of the outer arched ribs (11), and both (11, 13) sets of projections extend perimetrically such that an interconnecting circumferential channel (12) for interconnecting flow is defined between both sets of projections and wherein the heights of the partitions (14) are greater than the height of the remaining projections on the front wherein the inner edge of the rings comprises a bevel for separating the rings of the pack and all the sharp edges are rounded.

2. The sequential filter pack for fluids according to claim 1, wherein the connecting arched ribs (11) form a barrier of uniform height, and when several sets of projections formed by perimetrically extending arched ribs connected to one another are consecutively arranged, they are of uniform height with respect to one another and increasing as they advance towards the center of the ring.

3. The sequential filter pack for fluids according to claim 1, wherein the projections formed by the final arched ribs (13), which have the greatest height among all the projections formed by arched ribs, are such that the arched ribs forming them are located in a position matching up with the inlet of the channels of decreasing diverging section (15).

4. The sequential filter pack for fluids according to claim 1, wherein the projections giving rise to the channels of decreasing section (15) and channels of increasing section (16) have a maximum uniform height with respect to the height of the remaining projections.

5. The sequential filter pack for fluids according to claim 1, wherein the circumferential grooves (21) of the back have a section selected from triangular, square, rectangular and curved shapes.

\* \* \* \* \*

UNITED STATES PATENT AND TRADEMARK OFFICE
CERTIFICATE OF CORRECTION

PATENT NO.         : 8,771,514 B2
APPLICATION NO.    : 13/379434
DATED              : July 8, 2014
INVENTOR(S)        : Cobos De La Fuente Page 1 of 1

It is certified that error appears in the above-identified patent and that said Letters Patent is hereby corrected as shown below:

In the Claims

Claim 3, Column 6, Line 10: change "channels of decreasing diverging section (15)." to
-- channels of decreasing section (15). --

Signed and Sealed this
Fourteenth Day of October, 2014

Michelle K. Lee
*Deputy Director of the United States Patent and Trademark Office*